United States Patent [19]

Seltzer et al.

[11] 4,168,364

[45] Sep. 18, 1979

[54] CYANAMIDES OF ORGANIC PRIMARY AMINES AS EPOXY CURING AGENTS

[75] Inventors: Raymond Seltzer, New City; Joseph F. DiPrima, Chappaqua, both of N.Y.; William S. Durrell, Berwyn, Pa.

[73] Assignee: Ciba-Geigy Corporation, Ardsley, N.Y.

[21] Appl. No.: 933,692

[22] Filed: Aug. 15, 1978

[51] Int. Cl.$^2$ .............................................. C08G 59/50
[52] U.S. Cl. ........................................ 528/88; 528/93; 528/94; 528/124; 528/121; 528/361; 528/367; 528/368; 528/371; 528/407; 525/523; 260/37 R
[58] Field of Search ............... 528/121, 135, 361, 367, 528/407, 124, 88, 93, 94, 368

[56] References Cited

U.S. PATENT DOCUMENTS 3,893,974   7/1975   Niino et al. ..................... 260/47 EN

OTHER PUBLICATIONS

Helm et al., "Crosslinking of Epoxy Resins" Chemical Abstracts 78, 73110f (1973).
Seide et al., "Epoxy Polyadducts", Chemical Abstracts 85, 109511y (1976).

*Primary Examiner*—Earl A. Nielsen
*Attorney, Agent, or Firm*—Joseph F. DiPrima

[57] ABSTRACT

Curable compositions are prepared comprising an epoxide compound or a mixture of epoxide compounds having an average of at least two epoxide groups per molecule, and as a curing agent, a cyanamide of an organic primary amine or a mixture of cyanamides of organic primary amines having an average of more than one cyanamide moiety per molecule. Such compositions are useful in molding, casting, laminating and coating applications.

15 Claims, No Drawings

CYANAMIDES OF ORGANIC PRIMARY AMINES AS EPOXY CURING AGENTS

BACKGROUND OF THE INVENTION

The reaction of cyanamide or the calcium and sodium derivatives thereof with epichlorohydrin, ethylenechlorohydrin or propylenechlorohydrin to afford 2-iminooxazolidines has been disclosed as early as 1922. Since the iminooxazolidines thus obtained are not substituted in the 1-position they readily isomerize to 2-amino-2-oxalxolines. German Offenlegungschrift No. 2,534,693 discloses the use of anhydrous monomeric cyanamide to cure epoxide:cyanamide polyadducts in the presence of a tertiary amine acelerator. Monomeric cyanamide is an unstable compound and readily dimerizes to form dicyandiamide. Both phenyl and butyl cyanamide have been reacted with epichlorohydrin to afford a mixture of 1-substituted-2-imino-5-chloromethyl-1,3-oxazolidine and 2-N-substituted-amino-5-chloromethyl-1,3-oxazoline derivative as disclosed in Chem. Abst. 76: 153651 g. It is well known that dicyandiamide cures epoxy resins via a ring opening mechanism employing its imino or amino groups. Dicyandiamide is a high melting solid which is not very soluble in epoxy resins or organic solvents, thus; a curable composition containing dicyandiamide which is a dispersion or paste exhibits an exotherm on curing which is difficult to control.

DETAILED DESCRIPTION OF THE INVENTION

Cyanamides of organic primary amines are effective, latent, rapid, low-temperature curing agents for epoxy resins. The instant invention teaches a curable composition comprising an epoxide compound or a mixture of epoxide compounds having an average of at least two epoxide groups per molecule and a cyanamide of an organic primary amine or a mixture of cyanamides of organic primary amines having an average of more than one cyanamide moiety per molecule; wherein one mole of the cyanamide is employed to cure 0.1 to 4.0 moles of epoxide.

Epoxide compounds which may be employed in these curable compositions are those containing groups of formula

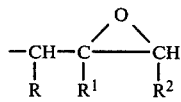

directly attached to atoms of oxygen, nitrogen, or sulphur, where either R and $R^2$ each represent a hydrogen atom, in which case $R^1$ denotes a hydrogen atom or a methyl group, or R and $R^2$ together represent $-CH_2CH_2-$, in which case $R^1$ denotes a hydrogen atom.

As examples of such resins may be mentioned polyglycidyl and poly($\beta$-methylglycidyl) ester obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphitic polycarboxylic acids, e.g., oxalic acid, succinic acid, glutaric acid, adipic acid, pimelic acid, suberic acid, and homopolymers and copolymers of acrylic acid and methacrylic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene) glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythitol, sorbitol, and poly(epichlorohydrin); from cycloaliphatic alcohols such as resorcitol, quinitol, bis(4-hydroxycyclohexyl) methane, 2,2-bis(4-hydroxycyclohexyl)-propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamine)diphenylmethane. Or they may be made from mononuclear phenols, such as resorcinol and hydroquinone, and from polynuclear phenols, such as bis(4-hydroxyphenyl) methane, 4,4'-dihydroxybiphenyl, bis(4-hydroxyphenyl)sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms such as aniline, n-butylamine, bis(4-aminophenyl)methane, and bis(4-methyl-aminophenyl)methane; triglycidyl isocyanurate; and N,N'-diglycidyl derivatives of cyclic alkylene ureas, such as ethyleneurea and 1,3-propyleneurea, and hydantoins of the formula

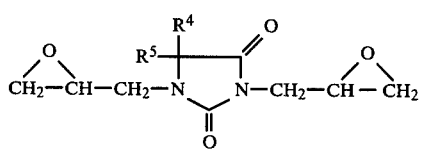

where $R^4$ and $R^5$ independently are alkyl groups containing 1 to 8 carbon atoms, or form a 5 or 6 member cycloaliphatic group.

Examples of poly(S-glycldyl) compounds are di-S-glycidyl derivatives of dithiols such as ethane-1,2-dithiol and bis(4-mercaptomethylphenyl) ether.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicyclic acid, hydantoins of the formula

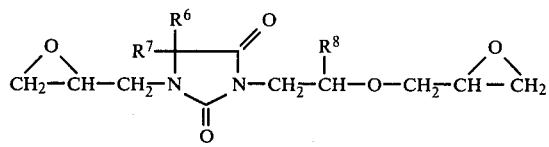

where $R^6$ and $R^7$ independently are alkyl groups containing 1 to 8 carbon atoms, or form a 5 or 6 member cycloaliphatic group and $R^8$ is a hydrogen atom or a methyl group, and 2-glycidyloxy-1,3-bis(5,5-dimethyl-1-glycidylhydantoin-3-yl)propane.

However, epoxide resins in which some or all of the epoxide groups are not terminal may also be employed, such as vinylcyclohexene dioxide, limonene dioxide, dicyclopentadiene dioxide, 4-oxatetracyclo-[6,2,1,0$^{2,7}$,0$^{3,5}$] undec-9-yl glycidyl ether, the bis(4-oxatetracyclo-[6,2,1,0$^{2,7}$,0$^{3,5}$] undec-9-yl) ether of ethylene glycol, 3,4-epoxycyclohexylmethyl-3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro[5,5]undecane, and epoxidised butadienes or copolymers of butadiene with ethylenic compounds such as styrene and vinyl acetate.

If desired, a mixture of epoxide resins may be used.

Preferred epoxide resins are polyglycidyl ethers, polyglycidyl esters, and N,N'-diglycidylhydantoins. Specific examples of such preferred resins are polyglycidyl ethers of 2,2-bis(4-hydroxyphenyl)-propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of more than 0.5 equivalent per kilogram.

Cyanamides of organic primary amines which may be employed in these curable compositions are those of the formula

$R^3(NHCN)_n$     II wherein n is an integer equal to or greater than one and $R^3$ is an n-valent organic radical from the series of aliphatic, cycloaliphatic, aromatic or heterocyclic moieties.

The preferred cyanamides of organic primary amines of the formula II are those wherein n is an integer of the group 1 to 10 and $R^3$ is an n-valent organic radical from the series of aliphatic of 2 to 12 carbon atoms, cycloaliphatic of 4 to 6 carbon atoms, aromatic of 6 to 30 carbon atoms, or a 5 or 6 membered heterocyclic containing carbon atoms and heteroatoms of the group consisting of oxygen, sulfur, and nitrogen.

The preferred heterocyclic cyanamides are those of the formula

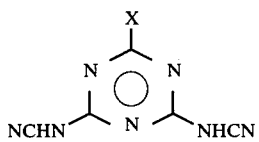

wherein X is a hydrogen, alkyl, aryl, dialkylamino or diacylamino group or the group —NHCN, and more specifically wherein X is hydrogen, alkyl of 1 to 6 carbon atoms, aryl of 6 to 12 carbon atoms, diloweralkylamino, diarylamino wherein said lower alkyl group contains 1 to 6 carbon atoms and said aryl group contains 6 to 12 carbon atoms or the group —NHCN.

The most preferred cyanamides of organic primary amines of formula II are the following wherein:

$R^3$ is alkylene containing 6 carbon atoms and n is two,
$R^3$ is m-xylylene and n is two,
$R^3$ is 4,4'-methylenebis(phenyl) and n is two,

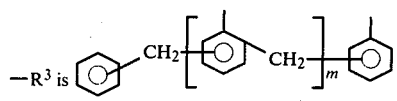

where m averages one and n averages three.

The most preferred cyanamides of organic primary amines of formula III are the following wherein:

X is phenyl
X is diphenylamino.

The cyanamide curing agents of this invention are very soluble in common organic solvents such as ketones, alcohols, ethers and glycolethers. Representative of the ketone solvents are acetone, 2-butanone, diethyl ketone, methyl isopropyl ketone, ethyl amyl ketone, methyl amyl ketone, and cyclohexanone; of the alcohol solvents are methanol, ethanol, isopropanol, butanol, amyl alcohol and cyclohexanol; of the ether solvents are tetrahydrofuran, 1,2-dimethyoxyethane and 1,2-diethoxyethane; and of glycol ethers are 2-methoxyethanol, 2-butoxyethanol, 2-ethoxy-ethyl ether, 2-(2-methoxyethoxy)ethanol and diethylene glycol dimethylether.

The cyanamide curing agents of the invention are prepared by known methods and include the following two synthetic routes:

1. Reaction of organic primary amines with a cyanogen halide;

       (A)

and

2. Reaction of unsubstituted cyanamide with alkylating agents;

       (B)

wherein $R^3$ and n are as defined previously and Y is chloride, bromide or iodide.

Representative of the organic primary amines which may be reacted with the cyanogen halide according to synthetic route A include the following:

ethylamine, n-propylamine, isopropylamine, n-butylamine, sec-butylamine, t-butylamine, n-amylamine, sec-amylamine, n-hexylamine, sec-hexylamine, 4,4'-diamino-2,2'-sulfonediphenylmethane, ethylenediamine, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenylsulfone, 3,3'-diaminodiphenylsulfone, 4,4'-diaminodiphenyl ether, 4,4'-diaminobenzophenone, bis-(4-aminophenyl)-N-methylamine, 1,5-diaminonaphthylene, 3,3'-dimethyl-4,4'-diaminobiphenyl, 3,3'-dimethoxybenzidine, 2,4-toluenediamine, 4,4'-methylene bis(o-chloroaniline), 4,4'-methylene bis(o-methoxyaniline), 4,4'-methylene bis (o-methylaniline), 4,4'-methylene bis(2,6-dimethylaniline), m-xylylenediamine, p-xylylenediamine, bis-(4-aminocyclohexyl)- methane, hexamethylenediamine, heptamethylenediamine, octamethylenediamine, nonamethylenediamine, decamethylenediamine, 3-methyl-heptamethylenediamine, 4,4'-dimethylheptamethylenediamine, 2,11-diaminododecane, 2,2-dimethylpropylenediamine, 3-methoxyhexamethyelendiamine, 4,4'-(p-aminophenyl)-dissulfide, 2,5-dimethylhexamethylenediamine, 2,5-dimethylheptamethylenediamine, 5-methylnonamethylenediamine, 1,4-diaminocyclohexane, 1,12-diaminooctadecane, 2,5-diamino-1,3,4-oxadiazole, $H_2N(CH_2)_3O(CH_2)O(CH_2)_3NH_2$, $H_2N(CH_2)_3S(CH_2)_3NH_2$, 2-diphenylamino-4,6-diamino-s-triazine, 2-dimethylamino-4,6-diamino-s-triazine, 2-dipropylamino-4,6-diamino-s-triazine, 2-phenyl-4,6-diamino-s-triazine, 2-ethyl-4,6-diamino-s-triazine, 2-butyl-4,6-diamino-s-triazine melamine and aniline-alde-hyde condensate formed from aldehydes such as formaldehyde, acetaldehyde, chloral and furfuraldehyde with anilines such as aniline and aniline substituted in the ring by chlorine atoms or by alkyl groups each containing up to nine carbon atoms such as 2-chloroaniline, 3-chloroaniline, o-toludine, m-toluidine and 2,6-dimethylaniline.

Representative of alkylating agents which may be reacted with unsubstituted cyanamide according to synthetic route B include the following:

ethyl chloride, ethyl bromide, ethyl iodide, n-propyl chloride, n-propyl bromide, i-propyl iodide, n-butyl bromide, i-butyl chloride, sec-butyl iodide, n-amyl chloride, i-amyl bromide, sec-amyl iodide, n-hexyl iodide, i-hexyl chloride, sec-hexyl bromide, n-heptyl chloride, n-octyl bromide, n-decyl chloride, n-dodecyl bromide, n-octadecyliodide, 1,2-ethylene dichloride, 1,3-propylene dibromide, 1,4-butylene diiodide, 1,5-pentamethylene dichloride, 1,6-hexamethylene diiodide, 1,7-heptamethylene dibromide, 1,8-octamethylene diiodide, 1,5-hexamethylene dichloride, benzyl chloride, o-methyl benzyl bromide, m-ethyl benzyl iodide, p-propylbenzyl chloride, alpha-alpha'-dichloroxylene.

The proportion in which the cyanamides are reacted with the 1,2-epoxide compounds are in the range of from 0.1 to 4 and preferably 1 to 2 epoxide groups per cyanamide equivalent. One cyanamide equivalent is understood to mean the quantity of cyanamide compound in grams which contains one cyanamide group.

The scope of this invention includes the reaction of epoxy compounds having two or more equivalents per molecule with primary cyanamides having two or more cyanamide functions per molecule. A combination of cyanamides, one with two or more cyanamide functions per molecule and one with one cyanamide function per molecule, may also be employed to cure an epoxy resin having two or more equivalents per molecule. Monocyanamides may also be used to crosslink epoxy resins having more than two epoxy equivalents per molecule. By adjusting the ratio of the monocyanamide to the polycyanamide one would be able to vary the crosslink density of the resultant thermoset polymer and therefore would be able to adjust the physical properties of the cured systems. The addition of monoepoxy compounds to mixture of polyepoxy and polycyanamide would also accomplish similar results.

The cyanamides of the instant invention may also be used in conjunction with standard epoxy resin hardeners to afford, with the addition of epoxy resins, a curable system with the advantage of low-temperature rapid curing from the cyanamide curing agent. Representative of the standard epoxy hardeners that may be employed include the following:

Aromatic amines, such as 4,4'-diamino-diphenylpropane, m-phenylenediamine, p-phenylenediamine, 4,4'-diaminodiphenylmethane, 4,4'-diaminodiphenylsulfide, 4,4'-diaminodiphenylsulfone, 3,3'-diaminodiphenylsulfone, 4,4'-diaminodiphenyl ether, 3,3'-dimethyl-4,4'-diaminobiphenyl, benzidine, 3,3'-dimethoxybenzidine, 2,4-toluenediamine, 4,4'-methylene-bis(o-chloroaniline), 4,4'-methylene-bis(o-methoxyaniline) and 4,4'-methylene-bis(o-methylaniline);

and phenolic hardeners, such as, resorcinol, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl) propane, and novolaks formed from aldehydes such as formaldehyde, acetaldehyde, chloral, and furfuraldehyde, with phenols such as phenol, and phenol substituted in the ring by chlorine atoms or by alkyl groups each containing up to nine carbon atoms such as 4-chlorophenol, 2-methylphenol, and tert-butylphenol. The cyanamides of this invention however cannot be used with the standard carboxylic acid and carboxylic acid anhydride hardeners due to the evolution of volatiles upon the reaction of cyanamides with the carboxylic moiety.

Curing accelerators can furthermore be employed in the curing reaction; such accelerators are, for example, tertiary amines, their salts or quaternary ammonium compounds, for example 2,4,6-tris(dimethylaminomethyl)-phenol, benzyldimethylamine, imidazole, 1-methylimidazole, 2-ethyl-4-methylimidazole, 4-aminopyridine, and triamylammonium phenolate; or alkali metal alcoholates, such as, for example, sodium hexanetriolate.

The amount of accelerator will usually range in the amount of from 0.1 to 10 parts by weight per 100 parts of the combined weights of epoxide resin and the curing agent.

The curing of the mixtures, according to the invention, of an epoxide compound and cyanamide of an organic primary amine is preferably carried out at temperature from 90° to 150° C. over a period of from ½ to 2 hours. The curing can, however, if desired also be carried out at higher temperatures and for longer times. The term "curing," as used here, denotes the conversion of the soluble, either liquid or fusible, polyepoxides into solids, insoluble and infusible, three-dimensionally crosslinked products or materials, accompanied, as a rule, with simultaneous shaping to give mouldings, such as castings, pressings, laminates and the like, or "sheet-like structures," such as coatings, lacquer films or adhesive bonds. The curing can, if desired, also be carried out in 2 stages, by first prematurely stopping the curing reaction, whereby a curable pre-condensate (so-called "B-stage"), which is still fusible and soluble, is obtained from the epoxide component and the cyanamide curing agent. Such as pre-condensate can be stored for a greater or lesser period and can, for example, serve for the manufacture of "prepregs," compression moulding compositions or, especially, sintering powders. Post-curing at temperatures in excess of the curing temperature may also be employed to increase the physical properties of the cured systems.

The cured compositions have good thermal stability and resistance to solvents and chemicals. They also exhibit good electrical properties. The mechanical properties of these cured systems are excellent. It was quite unexpected to achieve a glass transition temperature and an initial deormation temperature in excess of the curing temperature in the epoxy resin:cyanamide systems. These excellent mechanical properties are also evident in glass reinforced composites where the percentage retention of ambient temperature properties at 150° C. and 175° C. are excellent. It should also be observed that although curing temperatures are as low as 110° C., the composite can be postcured without restraint at 175° C. and 200° C. thus indicating the development of high green strength at this low curing temperature. This was also quite unexpected.

The curable mixtures according to the invention can furthermore contain suitable plasticisers, such as dibutyl phthalate, dioctyl phthalate or tricresyl phosphate, inert organic solvents and so-called active diluents, such as, monoepoxides, for example, styrene oxide, butylglycidyl or cresylglycidyl ethers.

Furthermore, the curable mixtures according to the invention can be mixed, in any stage before curing, with extenders, fillers and reinforcing agents, such as, for example, coal tar, bitumen, textile fibres, glass fibres, asbestos fibres, boron fibres, carbon fibres, mineral silicates, mica, quartz powder, titanium dioxide, hydrated aluminum oxide, bentonites, kaolin, silica aerogel or metal powders, such as aluminum powder or iron powder, and also with pigments and dyestuffs, such as carbon black, oxide pigments, titanium oxide and the like. Furthermore, other customary additives can also be added to the curable mixtures, for example flameproofing agents, such an antimony trioxide, agents for conferring thixotropy, flow control agents, such as silicones, cellulose acetobutyrate, polyvinyl butyral, waxes and stearates (which in part are also used as mould release agents).

The curable mixtures according to the invention can be manufactured in the usual manner, with the aid of known mixing equipment (stirrers, kneaders and rolls).

The curable epoxide resin mixtures according to the invention are above all employed in the fields of surface protection, the electrical industry, laminating processes and the building industry. They can be employed in a formulation suited in each case to the special end use, in the filled or unfilled state, optionally in the form of solutions or emulsions, as paints, lacquers, compression moulding compositions, dipping resins, casting resins, injection moulding formulations, impregnating resins and adhesives, tool resins, laminating resins, sealing and filling compositions, floor covering compositions and binders for mineral aggregates.

The preferred formulations are in the form of solution wherein the curable epoxide resin composition further comprises an inert organic solvent. Such solvents are common organic solvents such as ketones, alcohols, ethers and glycol ethers. The preferred concentration of these solutions is from 10 to 90 percent by weight of the combined weights of epoxide resin and curing agent. The most preferred concentration is from 40 to 70 percent by weight.

The following examples are presented to further illustrate this invention.

| Table of Epoxy Resins | |
|---|---|
| Epoxy Resin | Description |
| A | Epoxy cresol novolak (epoxy value 4.4 equiv/kg, ECN 1280). |

-continued

| Table of Epoxy Resins | |
|---|---|
| Epoxy Resin | Description |
| B | Bisphenol A diglycidyl ether (epoxy value 5.3 equiv/kg, ARALDITE 6010). |
| C | 70:30 mixture of 1,3-diglycidyl-5,5-dimethylhydantoin and 1-glycidyl-(2-glycidyloxypropyl)-5,5-dimethylhydantoin (epoxy value 6.9 equiv/kg). |
| D | 1,3-diglycidyl-5-sec-aamyl-5-ethylhydantoin (epoxy value 6.2 equiv/kg). |
| E | 3,4-epoxy cyclohexylmethyl-3',4'-epoxycyclo hexanecarboxylate (epoxy value 7.3 equiv/kg, CY 179). |
| F | Bisphenol-A diglycidylether advanced with bisphenol A (epoxy value 1.4 equiv/kg, GT 7014). |
| G | Tetraglycidyl-bis(4-aminophenyl)methane (epoxy value 8.0 equiv/kg, MY 720). |

A. PREPARATION OF EPOXY:CYANAMIDE MOLDING COMPOUNDS

EXAMPLE 1

4,4'-Methylenebis(phenylcyanamide)(MBPC, 27.3 parts) and an epoxy resin A (100 parts) were dry blended at room temperature and then run through a roller mill at 156°–163° F. for 10 minutes. The resulting solid was ground into a fine powder which gelled in 75 seconds at 125° C. and exhibited a glass transition temperature by torsional braid analysis in excess of 225° C. after post curing at 190° C. for 4 hours. After one month the gel time of the above composition remained unchanged and the gel permeation chromatograph also remained unchanged.

EXAMPLE 2

5 parts of the composition prepared in Example 1 was pressed at 135° C./2,000 psi for 30 minutes to afford a tough, homogeneous molding.

EXAMPLE 3

A molding powder was prepared by dry blending the composition obtained in Example 1 (10 parts), epoxy resin A: HT 9490 (similarly prepared from 100 parts epoxy resin A+50 parts HT 9490—a phenolic hardener—10 parts) and imidazole (0.05 parts). The above molding powder gelled in 60 seconds at 125° C. and exhibited a glass transition temperature by torsional braid analysis of 213° C. after post curing at 190° C. for 4 hours.

Table I is a comparison of MBPC:epoxy resin A formulations in conjunction with phenolic hardener HT 9490 and by itself with the standard molding system of epoxy resin A:HT 9490 and imidazole.

TABLE I

| | | Tg by TBA | Gel Times (FJ) |
|---|---|---|---|
| Epoxy resin A | 1 eq | 170° C. (150°/2 hrs.) | |
| HT 9490 | 1 eq | 198° C. (190°/1 hr.) | |
| Imidazole | 1 phr | | 5 min./125° C. |
| Epoxy resin A | 4 eq | 155° C. (135°/1 hr.)[a] | |
| HT 9490 | 2 eq | 213° C. (190°/4 hrs.) | |
| MBPC | 1 eq[b] | | 2 min./110° C. |
| Imidazole | 0.5 phr | | 1 min./125° C. |
| Epoxy resin A | 2 eq | 165° C. (133°/1 hr.)[a] | |
| MBPC | 1 eq[b] | >225° C. (190°/4 hrs.) | 75 sec./125° C. |
| No /Catalyst | | | |
| Epoxy resin A | 2 eq | — | |
| MBPC | 1 eq[b] | — | 35 sec./125° C. |

TABLE I-continued

| | | Tg by TBA | Gel Times (FJ) |
|---|---|---|---|
| Imidazole | 1 phr | | — |

FJ = Fisher Johns Apparatus
*aAdditional curing takes place during Tg determination.
b1 eq of MBPC is 1-NHCN moiety

EXAMPLE 4

4,4'-Methylenebis(phenylcyanamide)(32.8 parts) and epoxy resin B (101.2 parts) were dissolved in tetrahydrofuran (100 parts). The solution was heated to 55° C. while removing the solvent at reduced pressure to afford a viscous resin which was heated at 55° C. for 10 minutes then poured into an aluminum tray and allowed to solidify at room temperature over 5 days. The solid resin was ground into a fine powder and the last traces of solvent removed under vacuum at room temperature. The resulting molding powder was fabricated into a 4"×5"×⅛" plaque by compression molding at 120° C. for 30 minutes at 100 psi pressure. The plaque which was then postcured at 175° C. for 3 hours exhibited a initial deformation temperature of 185° C., tensile strength of 11,100 psi, tensile modulus of 368,000 psi and 5.2% elongation to break.

Initial deformation temperature was determined as the temperature at which a standard test bar 81.27 cm wide×0.635 cm deep), centrally loaded on a 100 mm span, deflected and additional 0.25 mm under load that gave maximum (outer-layer) stress of 1.82 MPa, while being heated at a rate of 2° C./min. The operating procedure followed ASTM D648-72, but the maximum strain reached at the IDT was half that at the "deflection temperature under load" (DTUL), so IDT was several degrees lower than DTUL.

B. PREPARATION OF EPOXY:CYANAMIDE GLASS REINFORCED COMPOSITES

EXAMPLE 1

4,4'-Methylenebis(phenylcyanamide)(26.0 parts) was dissolved in acetone (60 parts) and then added to epoxy resin C (60.0 parts) at room temperature with stirring. Fiberglass cloth (1581 A1100 hard finish) was impregnated with the above epoxy:cyanamide varnish and heated for one hour at 60° C. A composite was fabricated by subjecting a 14-ply laminate to heating at 125° C. on the press without pressure for 2 minutes followed by 43 minutes at 125° C. under 375 psi pressure. The above composite which was then postcured for 3 hours at 175° C. without restraint exhibited a short beam shear strength of 7.7 kg/mm² at 25° C. and 5.6 kg/mm² at 150° C. (See Table II for more details.)

EXAMPLE 2

An epoxy:cyanamide varnish, prepared as in Example 1, from 4,4'-methylenebis(phenylcyanamide)(23.1 parts), ethyleneglycol monomethyl ether (40.7 parts) and epoxy resin D (60.0 parts) was fabricated into a glass-reinforced composite by subjecting a 14-ply laminate to heating for 5 minutes at 125° followed by 210 minutes at 125° C. under 375 psi pressure. The above composite which was then postcured for 3 hours at 175° C. without restraint exhibited a short beam shear strength of 3.3 kg/mm² at 25° C.

EXAMPLE 3

An epoxy:cyanamide varnish, prepared as in Example 1, from 4,4'-methylenebis(phenylcyanamide)(16.4 parts), ethyleneglycol monomethyl ether (76 parts) and epoxy resin A (60 parts) was fabricated into a glass-reinforced composite by subjecting a 14-ply laminate to heating for 1.5 minutes at 130° C. followed by 8.5 minutes at 130° C. under 375 psi pressure. The above composite which was then postcured for three hours at 175° C. without restraint exhibited a short beam shear strength of 5.2 kg/mm² at 25° C.

EXAMPLE 4

An epoxy:cyanamide varnish, prepared as in Example 1, from 4,4'-methylenebis(phenylcyanamide)(48.8 parts), acetone (150 parts) and epoxy resin B (150 parts) was fabricated into a glass-reinforced composite by heating the varnish-impregnated glass cloth at 60° C. for one hour followed by subjecting a 14-ply laminate to 110° C. at 375 psi pressure for 45 minutes. The above composite which was then postcured for 3 hours at 175° C. without restraint exhibited a short beam shear strength of 6.7 kg/mm² at 150° C. (see Table II).

EXAMPLE 5

A glass-reinforced composite, prepared as in Example 4, from cyanamide of an aniline formaldehyde condensate (DuPont's POLYMAN, 25.6 parts), acetone (100 parts) and epoxy resin B (75 parts) was fabricated at 110° C. for 65 minutes at 375 psi pressure. The above composite which was postcured for 3 hours at 175° C. without restraint exhibited a short beam shear strength of 6.8 kg/mm² at 25° C. and 4.3 kg/mm² at 150° C. (see Table II).

EXAMPLE 6

An epoxy:cyanamide varnish, prepared as in Example 1, from 4,4'-methylene bis(phenyl-cyanamide (90 parts), tetrahydrofuran (150 parts) and epoxy resin E (100 parts) was fabricated into a glass-reinforced composite after heating the varnish-impregnated glass cloth at 90° C. for 30 minutes followed by subjecting a 14-ply laminate to 125° C. at 100 psi pressure for 1 hour. The above composite which was then postcured for 3 hours at 175° C. without restraint exhibited a short beam shear strength of 4.4 kg/mm² at 175° C. (See Table II).

EXAMPLE 7

An epoxy:cyanamide varnish, prepared as in Example 1, from 4,4'-methylene bis(phenyl cyanamide)(45 parts), acetone (80 parts) and epoxy resin E (100 parts) was fabricated into a glass-reinforced composite after heating the varnish impregnated glass cloth at 80° C. for 90 minutes followed by subjecting a 14-ply laminate to 140° C. at 100 psi pressure for 1 hour. The above composite which was then postcured for 3 hours at 200° C. without restraint exhibited a short beam shear strength of 5.0 kg/mm² at 150° C. (See Table II).

EXAMPLE 8

An epoxy:cyanamide varnish, prepared as in Example 1, from 4,4'-methylene bis(phenylcyanamide) (49.6 parts), tetrahydrofuran (108 parts) and epoxy resin G (100 parts) was fabricated into a glass-reinforced composite after heating the varnish impregnated glass cloth at 60° C. for 1 hour followed by subjecting a 14-ply laiminate to 115° C. at 100 psi pressure for 1 hour. The above composite which was then postcured for 3 hours at 175° C. without restraint exhibited a short beam shear strength of 3.2 kg/mm² at 175° C. (See Table II).

TABLE II

|  | Test Temperature °C. | Flex Strength, kg/mm² | Flex Modulus, kg/mm² | Short Beam Shear Strength, kg/mm² |
|---|---|---|---|---|
| Example 4 60° C./1 hr. + 110° C./45 min./375 psi + 175° C./3 hrs. 26.5% resin | 25 150 | 54 44 (81%) | 2,560 2,220 (87%) | 6.7 4.5 (67%) |
| Example 5 60° C./50 min. + 110° C./65 min./375 psi + 175° C./3 hrs. 31% resin | 25 150 | 53 38 (72%) | 2,360 2,070 (88%) | 6.8 4.3 (64%) |
| Example 1 60° C./1 hr. + 110° C./45 min./375 psi + 175° C./3 hrs. 30% resin | 25 150 | 59 49 (82%) | 2,460 2,260 (92%) | 7.7 5.6 (73%) |
| Example 6 90° C./30 min. 125° C./1 hr./100 psi 175° C./3 hr. 33.4% resin | 25 150 175 | 51 37 (73%) 37 (73%) | 2,212 1,855 (84%) 1,890 (85%) | 7.2 4.7 (65%) 4.4 (61%) |
| Example 7 80° C./90 min. 140° C./1 hr./100 psi 200° C./3 hr. 34.3% resin | 25 150 | 49 41 (84%) | 2,303 2,114 (92%) | 6.44 5.0 (78%) |
| Example 8 60° C./1 hr. 115°/1 hr./100 psi 175°/3 hr. 38% resin | 25 175 | 43 32.9 (77%) | 1.946 1,806 (93%) | 4.6 3.2 (63%) |

C. PREPARATION OF EPOXY:CYANAMIDE CASTING

Example 1

4,4'-Methylenebis(phenylcyanamide) (90 parts) and a epoxy resin E (200 parts) were blended into a slurry and heated rapidly to 105°–110° C. while stirring briskly to effect solution. Degassing by vacuum was then started while the blend was cooled quickly down to 70° C. Degassing was continued for 10 minutes at 70°–80° C. This blend was then cast into ⅛" and ¼" thick plaques in glass molds, curing at 85° C. for 2 hours and postcuring at 150° C./2 hours+200° C./2 hours. See Table III for properties of the cured material.

Example 2

4,4'-Methylenebis(phenylcyanamide) (62.7 parts) was dissolved in tetrahydrofuran (160 parts) to which solution was added epoxy resin C (140 parts). Tetrahydrofuran was then removed by vacuum with stirring. Heat applied to maintain a workable viscosity as the solvent was removed raising the temperature to 65° C. This blend was then cast into ⅛" and ¼" thick plaques in glass molds using the cure schedule 60° C./2 hours+125° C./2 hours+175° C./2 hours. See Table III for properties of the cured material.

Example 3

Epoxy resin B (170 parts) was added to a solution of 4,4'-methylenebis(phenylcyanamide) (55 parts) in tetrahydrofuran (140 parts). Tetrahydrofuran was then removed by vacuum with stirring while gradually heating to 50° C. to maintain a workable viscosity. This took about 1½ hours. The blend was then cast into ⅛" and ¼" thick plaques in glass molds following the cure schedule of Example 2. See Table III for properties of cured material.

Example 4

Epoxy resin D (130 parts) was added to a solution of 4,4'-methylene bis(phenylcyanamide) (50.4 parts). The blend was then stripped of tetrahydrofuran and cast into ⅛" and ¼" plaques as in Example 2. See Table III for the properties of the cured material.

Table III

| EPOXY RESINS CURED WITH MBPC AT EPOXY/NCNH = 2.0 | | | | | | |
|---|---|---|---|---|---|---|
| | | Room Temperature Properties | | | | |
| Epoxy Resin | Cure Schedule (°C./Hr.) | Tensile Strength, Kg/mm² | EB, % | Flex Strength, Kg/mm² | Young's Modulus Kg/mm² | IDT, °C. |
| E (cast/neat) | 85/2 + 150/2 + 175/2 | 5.1 | 1.5 | 14 | 360 | 173 197[a] |
| C (cast/THF) | 60/2 + 125/2 + 175/2 | 9.4 | 6.9 | 12.5[b] | 340 | 186 |
| D (cast/THF) | 60/2 + 125/2 + 175/2 | 6.7 | 5.2 | 9.2[b] | 220 | 197 |
| B (cast/THF) | 60/2 + | 8.3 | 8.3 | 9.5[b] | 320 | 158 |

Table III-continued

| | EPOXY RESINS CURED WITH MBPC AT EPOXY/NCNH = 2.0 | | | | | | |
|---|---|---|---|---|---|---|---|
| | | | Room Temperature Properties | | | | |
| Epoxy Resin | Cure Schedule (°C./Hr.) | Tensile Strength, Kg/mm² | EB, % | Flex Strength, Kg/mm² | Young's Modulus Kg/mm² | | IDT, °C. |
| | 125/2 + 175/2 | | | | | | |

[a] After 200° C./2 hours further postcure
[b] At 5% outer-surface strain; did not break.

D. COATING APPLICATION

Example 1

4,4'-Methylenebis(phenylcyanamide) (0.35 parts) and epoxy resin F (4.0 parts) were dissolved in 2-methoxyethanol (6.5 parts) at room temperature to form a clear varnish. The above varnish was used to coat aluminum Q panels and was subsequently cured for 15 minutes at 150° C. to afford a clear, chemically resistant coating which had good physical properties. (See Table IV for details.)

Example 2

4,4'-Methylenebis(phenylcyanamide) (0.35 parts) epoxy resin F (4.0 parts) and imidazole (0.04 parts) were dissolved in 2-methoxyethanol (6.5 parts) at room temperature to form a clear varnish. The above varnish was used to coat aluminum Q panels and was subsequently cured for 15 minutes at 110° C. to afford a clear, chemically resistant coating which had good physical properties. (See Table IV for details.)

Example 3

The cyanamide of Polyman (DuPont's-aniline formaldehyde condensate, 0.37 parts), epoxy resin F (4.0 parts) and imidazole (0.04 parts) were dissolved in 2-methoxyethanol (6.5 parts) at room temperature to form a clear varnish. The above varnish was used to coat an aluminum Q panel and was subsequently cured for 15 minutes at 110° C. to afford a clear, chemically resistant coating which had good physical properties. (See Table IV for details.)

Example 4

Hexamethylene dicyanamide (1 part) and epoxy resin F (18.4 parts) were dissolved in methylethyl ketone (27 parts) at room temperature to form a clean varnish. The above varnish was used to coat aluminum Q panels and was subsequently cured for 20 minutes at 165° C. to afford a clear, chemically resistant coating.

Example 5

Xylylene dicyanamide (0.5 part) and epoxy resin F (8.2 parts) were dissolved in methylethyl ketone (9.5 parts) at room temperature and a minor amount of insolubles were filtered off to form a clear varnish. The above varnish was used to coat aluminum Q panels and was subsequently cured for 20 minutes at 235° C. to afford a clear, chemically resistant coating.

E. POWDER COATING APPLICATIONS

Example 1

Initially powders of each component was prepared by grinding where necessary. The powders of epoxy resin F (100 parts), 4,4'-methylene bis(phenylcyanamide) (8.8 parts), white pigment (54 parts, Titanox 2062[1]), flow control agent (1.5 parts, Modaflow Powder II[2]) and antiblocking agent (0.34 parts, Silica M-5[3]) were first dry blended by manual agitation and then melt blended on a two-roll mill at 155° to 165° F. for 10 minutes.

[1] A rutile titanium dioxide—NL Industries.
[2] Monsanto Company.
[3] Funied Silica—Cabot Corporation.

The formulated mixture was ground in a pin mill and sieved to collect all material under 75 microns in size. This powder was electrostatically sprayed on cleaned steel and aluminum panels, which were then heated in a circulating air oven at specified conditions. Coatings were visually inspected, and tested for thickness, impact strength, flexibility on bending, adhesion, hardness, gloss and resistance to MEK, water and other chemicals. Chemical resistance was checked visually and by

TABLE IV

| | Properties of Clear Coatings from Solution | | | |
|---|---|---|---|---|
| Composition (pbw) | Epoxy resin F | 4.0 | 4.0 | 4.0 |
| | MBPC | 0.35 | 0.35 | — |
| | PNCN | — | — | 0.37 |
| | Imidazole | — | 0.04 | 0.04 |
| | 2-Methoxyethanol | 6.5 | 6.5 | 6.5 |
| Cure Schedule Needed to Pass 200 MEK Rubs (min./° C.) | | 15/150 | 15/≦110 | 15/≦110 |
| Thickness (Mil) | | 0.8-1.3 | 0.8-1.2 | 0.8-1.1 |
| Reverse impact Strength on 25-Mil Aluminum (in.-lbs.) | | 40 | 44 | 40 |
| Mandrel Bend Pass at: | | 1/8" | 1/8" | 1/8" |
| Cross-Cut Adhesion (%) | | 100 | 100 | 100 |
| Color | | None | None | Sl. Yellow |
| Appearance | | Clear | Clear | Clear | rubbing after prolonged immersions. Samples of the formulated powders were also stored at 40° C. to check for stability to blocking at this temperature. (See Table V for physical properties.)

Examples 2-3

The following formulations were prepared according to Example 1.

Example 2

Epoxy resin F (100 parts), the cyanamide of aniline formaldehyde condensate (9.2 parts), imidazole (1 part), white pigment (54 parts), flow control agent (1.5 parts) and antiblocking agent 0.34 parts) (See Table V for properties).

Example 3

Epoxy resin F (100 parts), the cyanamide of aniline formaldehyde condensate (9.2 parts), imidazole (0.5 parts), white pigment (54 parts), flow control agent (1.5 parts) and antiblocking agent 0.34 parts) (see Table V for properties.)

TABLE V.
| | PROPERTIES OF EPOXY POWDER COATINGS | | | |
|---|---|---|---|---|
| Property Formulation | Example 1 | | Example 2 | Example 3 |
| Cure Schedule (Min/° C.) | 20/150 | 15/155 | 15/145 | 15/145 |
| Film Thickness (Mils) | 1.2-1.8 | 1.1 | 1.8 | 1.2 |
| Reverse Impact Strength on Steel (in.-lbs.) | >160 | >160 | 160 | >160 |
| Mandrel Bend Pass at: | 1/8" | 1/8" | 1/8" | 1/8" |
| Cross-Cut Adhesion % Retained | 100 | 100 | 100 | 100 |
| MEK Resistance 200 Rubs | Pass | Pass | Pass | Pass |
| Chemical Resistance* | Excellent | — | — | — |
| Specular Gloss @ 60° | 70 | 74 | 73 | 76 |
| Visual Color | White | White | Yellow | Yellow |
| Surface Appearance | Good Flow, slight orange peel | Good Flow, slight orange peel | Med. Flow, orange peel | Med. Flow orange peel |
| Pencil Hardness | 3H | 4H | — | 6H |
| Processed @ (Min/° C.) | 10/71 ± 3 | 10/69 ± 1 | 5/59 ± 2 | 5/61 ± 2 |
| Powder Gel Time (Sec. @ 171° C.) | 104 | 96 | 17 | 40 |
| Powder Stability to Blocking @ 40° | >3 months | >1 month | — | >1 month |

*On 10 weeks of immersion in 5% NaOH, 30% NaOH, 10% NH₃, 3% HNO₃, 10% acetic acid, distilled water, toluene.

What is claimed is:
1. A heat curable composition comprising:
(a) a 1,2-epoxide compound or a mixture of epoxide compounds having an average of at least two epoxide groups per molecule; and
(b) a cyanamide of organic primary amine or mixture of cyanamides of organic primary amines having an average of more than one cyanamide moiety per molecule; wherein one mole of cyanamide is employed to cure 0.1 to 4.0 moles of epoxide.
2. A composition of claim 1 wherein the 1,2 epoxide compound is selected from the group consisting of compounds of the formula

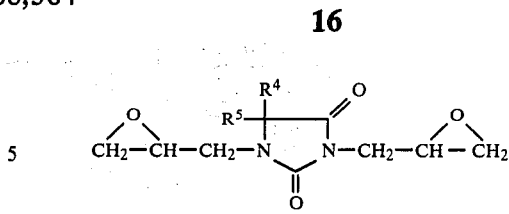

where $R^4$ and $R^5$ independently are alkyl groups containing 1 to 8 carbon atoms, or together form a 5 or 6 member cycloaliphatic group; compounds of the formula

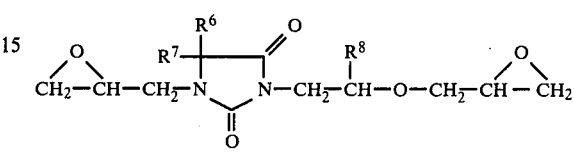

where $R^6$ and $R^7$ independently are alkyl groups containing 1 to 8 carbon atoms or together form a 5 or 6 membered cycloaliphatic group, and $R^8$ is a hydrogen atom or a methyl group; glycidyl ethers of polynuclear phenols, and of novolaks formed from formaldehyde and phenol or cresol; cycloaliphatic epoxides containing non-terminal epoxide groups; and glycidyl amines of polynuclear aromatic amines.
3. A composition according to claim 1 wherein the cyanamide of an organic primary amine is of the following formula $$R^3(NHCN)_n$$

wherein n is an integer of the group 1 to 10 and $R^3$ is an n-valent organic radical from the series of aliphatic of 2 to 12 carbon atoms, cycloaliphatic of 4 to 6 carbon atoms, aromatic of 6 to 30 carbon atoms, or a 5 or 6 membered heterocyclic containing carbon atoms and heteroatoms of the group consisting of oxygen, sulfur, and nitrogen.

4. A composition of claim 3 wherein $R^3$ is alkylene containing 6 carbon atoms and n is two.

5. A composition of claim 3 wherein $R^3$ is m-xylylene and n is two.

6. A composition of claim 3 wherein $R^3$ is 4,4'-methylenebis(phenyl) and n is two.

7. A composition of claim 3 wherein

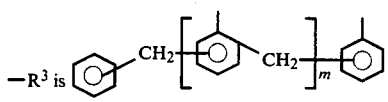

where m averages one and n averages three.

8. A composition of claims 6 or 7 wherein the 1,2 epoxide compound is selected from the group consisting of 1,3-diglycidyl-5-sec-amyl-5-ethylhydantoin, a mixture of 1,3-diglycidyl-5,5-dimethylhydantoin and 1-glycidyl-3-(2-glycidyloxypropyl)-5,5-dimethylhydantoin, diglycidylether of 2,2-bis(4-hydroxyphenyl)propane, 3,4-epoxycyclohexylmethyl-3',4'-epoxycyclohexanecarboxylate and tetraglycidyl-bis(4-aminophenyl)methane.

9. A composition of claim 3 wherein $R^3$ is

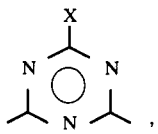

n is two and X is hydrogen, alkyl, aryl, dialkylamino, diacylamino group, or the group —NHCN.

10. A composition of claim 9 wherein X is hydrogen, alkyl of 1 to 6 carbon atoms, aryl of 6 to 12 carbon atoms, diloweralkylamino, diarylamino wherein said lower alkyl group contains 1 to 6 carbon atoms and said aryl group contains 6 to 12 carbon atoms or the group —NHCN.

11. A composition of claim 10 wherein X is phenyl or diphenylamino.

12. A composition of claim 1 which further comprises an epoxide curing agent selected from the group of aromatic amines or phenolic hardeners.

13. A composition of claims 1 or 12 which further comprises from 0.1 to 10 percent by weight of the combined weights of epoxide resin and curing agent of a curing accelerator.

14. A composition according to claim 1 wherein one mole of cyanamide is employed to cure 1.0 to 2.0 moles of epoxide.

15. A composition according to claim 1 which further comprises an inert organic solvent.

* * * * *